United States Patent [19]

Hohenthal et al.

[11] Patent Number: 5,773,056
[45] Date of Patent: Jun. 30, 1998

[54] HIGH COCOA/CHOCOLATE LIQUOR SYRUPS WITH IMPROVED FLOW PROPERTIES

[75] Inventors: Thalia A. Hohenthal, Santa Clara; Michelle Weinberg, San Bruno, both of Calif.

[73] Assignee: Guittard Chocolate Company, Burlingame, Calif.

[21] Appl. No.: 713,275

[22] Filed: Sep. 12, 1996

[51] Int. Cl.⁶ .................................................. A23G 1/00
[52] U.S. Cl. ........................... 426/45; 426/44; 426/48; 426/49; 426/50; 426/52; 426/584; 426/593; 426/631
[58] Field of Search .................. 426/44, 45, 48, 426/50, 51, 52, 549, 564, 572, 584, 593, 658, 659, 660, 631, 49

[56] References Cited

U.S. PATENT DOCUMENTS

| | | | |
|---|---|---|---|
| 1,854,354 | 4/1932 | Wallerstein | 426/45 |
| 2,014,342 | 9/1935 | Gutekunst | 426/45 |
| 2,965,490 | 12/1960 | Rusoff | 426/45 |
| 3,397,061 | 8/1968 | Katz | 426/45 |
| 3,821,420 | 6/1974 | Arden | 426/45 |
| 3,982,042 | 9/1976 | Arden | 426/631 |
| 4,343,818 | 8/1982 | Eggen | |
| 4,948,600 | 8/1990 | Zumbé et al. | 426/45 |

FOREIGN PATENT DOCUMENTS

| | | |
|---|---|---|
| 622 028 | 3/1981 | Germany . |
| 50-33137 | 10/1975 | Japan . |
| 61-219339 | 9/1986 | Sweden . |

OTHER PUBLICATIONS

Shimazaki et al. Patent Abstracts of Japan, Abstracting 07–79749, Mar. 1995.

*Primary Examiner*—Leslie Wong
*Attorney, Agent, or Firm*—Townsend and Townsend and Crew LLP

[57] ABSTRACT

Compositions containing cocoa, sweetener, a combination of food-grade enzymes, and optionally chocolate liquor are described. The compositions provide a cocoa/chocolate liquor flavored syrup having a high concentration of the flavoring, in part due to the substantially higher usage of cocoa and liquor than previous syrups. Additionally, the compositions have excellent flow properties for use in beverages and confections, while further having a low water activity which leads to a longer and more commercially useful shelf life. Some compositions will also contain an acidulant, a mold inhibitor, and vanilla flavor.

14 Claims, No Drawings

5,773,056

HIGH COCOA/CHOCOLATE LIQUOR SYRUPS WITH IMPROVED FLOW PROPERTIES

This invention lies in the field of chocolate and cocoa syrups which are useful in the flavoring of beverages and confections.

BACKGROUND OF THE INVENTION

The flavoring of beverages and confections with water-based dispersions of chocolate ingredients has been very limited in flavor type and intensity. This is partly due to the high viscosities that result from high levels of cocoa and/or chocolate liquor required to yield a rich chocolate flavor.

Currently, water-based dispersions of chocolate ingredients are prepared from cocoa powder, typically using only low fat cocoa. See, U.S. Pat. No. 4,343,818, incorporated herein by reference. Conventional cocoa powder is prepared from roasted cocoa beans by removing the husks or shells and grinding the roasted beans to a semi-liquid sludge known as chocolate liquor. The fat (cocoa butter) is then partially separated from the chocolate liquor, generally by pressing, resulting in partially defatted solids which are finely ground to give the product known as cocoa, or cocoa powder. The cocoa powder may then be subjected for a further treatment known as "dutching", in which it is contacted with an alkali, usually potassium carbonate, in the presence of water.

The main purpose of dutching is to render the cocoa more easily dispersible in water. The chemical reactions which occur during dutching are complex but it is believed that a limited hydrolysis takes place, producing compounds which render the cocoa less hydrophobic.

The traditional dutching process gives a product which disperses in warm water or milk more or less readily but which is still far from being completely soluble. Thus, on dispersion in water, an emulsion is produced rather than a solution and the emulsion is opaque with a deep brown color and characteristic heavy taste. These characteristics make conventional cocoa unsuitable for coloring and flavoring foods requiring a light appearance and texture, such as certain types of decorative creams and icings, or for soft drinks in which complete water-solubility is practically essential.

Chocolate liquor, despite its important contribution to a rich chocolate flavor, is rarely used in chocolate syrups because it provides compositions which are too viscous. Chocolate liquor has a fat content of about 50 to 55% and has only been used in very small amounts for some limited compositions. See, U.S. Pat. No. 3,821,420. In general, the chocolate flavoring syrups known in the art contain low proportions of cocoa (about 5%) and resist the incorporation of any chocolate liquor. Frequently this type of syrup yields a desired viscosity but not the desired flavor. If higher levels of cocoa or chocolate liquor (the combination hereinafter referred to as "the flavoring") are used, it is known that the viscosity will be increased to the point that room temperature use for commercial food service is not possible.

In an effort to incorporate higher levels of cocoa, Arden (U.S. Pat. No. 3,821,420) described the use of amylolytic enzymes to reduce the viscosity associated with increased cocoa content. One disadvantage of amylolytic enzyme treatment for syrups with high levels of the flavoring is that the viscosity will, in the time needed for national distribution of a commercial product, revert and increase to the point where the syrup cannot be used in dispensing equipment at room temperature. This prohibits the use of such a syrup in many segments of the food service industry. Another disadvantage of high levels of flavoring in a syrup is that the water activity is difficult to control with the traditional addition of sucrose as the sweetener because the flavoring tends to require so much water for hydration. This leads to limitations in packaging and distribution to also prevent commercial use of such formulations.

What is needed in the art are new cocoa/chocolate syrup compositions which provide high contents of chocolate flavor and which have flow properties suitable for various commercial applications over a long period of time. Surprisingly, the present invention provides such compositions and methods for their preparation.

SUMMARY OF THE INVENTION

The present invention provides a composition comprising chocolate flavoring, sweetener, and a combination of food-grade enzymes. In some embodiments the composition will further comprise an acidulant, a mold inhibitor, vanilla flavor, or combinations thereof. The chocolate flavoring can be either cocoa (in an amount of from about 15–20 weight percent) or a combination of cocoa and chocolate liquor (in which the cocoa is present in an amount of from about 12–19 weight percent and the chocolate liquor is present in an amount of from about 1–5 weight percent). This composition provides a cocoa/chocolate liquor flavored syrup having a high concentration of the flavoring, in part due to the substantially higher usage of cocoa and liquor than previous syrups. Additionally, this composition has excellent flow properties for use in beverages and confections, while further having a low water activity which leads to a longer and more commercially useful shelf life. These compositions are readily dispensed and mixed at ambient temperatures with ingredients for beverages and confections. More particularly, the present compositions comprise an aqueous solution or suspension containing from about 15–20 weight percent cocoa, from about 0–5 weight percent chocolate liquor, from about 35 to 50 weight percent sweetener, a combination of enzymes including, an $\alpha$-amylase, a pentosanase and a pectinase, and optionally an acidulant, a mold inhibitor, vanilla flavor, or combinations thereof.

The present invention further provides methods for the preparation of the cocoa/chocolate liquor syrups described above.

Other advantages, features and embodiments of the invention will be apparent from the description which follows.

DETAILED DESCRIPTION OF THE INVENTION

Cocoa/chocolate liquor compositions

In one aspect, the present invention provides a cocoa/chocolate liquor composition comprising an aqueous solution containing cocoa, sweetener, a combination of enzymes including an $\alpha$-amylase, a pentosanase and a pectinase, and optionally chocolate liquor. In some embodiments, the compositions will further comprise an acidulant, a mold inhibitor, vanilla flavor, or combinations thereof.

As noted above, cocoa is typically referred to as having various degrees of fat (cocoa butter) and is available as low fat cocoa (having about 8–10% cocoa butter content), medium fat cocoa (having about 10–12% cocoa butter content) up to high fat breakfast cocoa (having 26–28% cocoa butter content). For use in the present invention, the type of cocoa is preferably either high fat (having in the range of 22–24% residual cocoa butter) or medium fat (having in the range of 10–12% residual cocoa butter). The choice of flavor of the cocoa may vary greatly. Additionally, combinations of cocoa types may be used to further enhance the quality of the flavor.

The precise amount of cocoa used can vary greatly depending upon the fat content of the cocoa and the presence or absence of chocolate liquor. As the present invention relates to achieving high flavor levels with suitable flowable properties, the compositions can accommodate up to about 20% cocoa. Any adjustment downward depends on flavor desires and quantity of chocolate liquor used.

As noted above, the use of chocolate liquor as part of the flavoring system in a chocolate syrup is possible, and preferred, in this invention. The type may be of dutched or natural process. The amount is based on the total fat content of the syrup formulation. The fat content of the syrup may be higher or lower depending upon the total non-fat cocoa solids content. The higher the non-fat cocoa solids content of the formulation, the lower the total fat content. Additionally, for formulations with lower cocoa levels, the chocolate liquor content level may be increased. The most useful range of chocolate liquor in this invention is 1–5%.

Commercially available chocolate liquor has a fat content of about 50 to 55%. The amount of cocoa and chocolate liquor which are present will depend on the combined cocoa butter content of the various species. Thus, cocoa will be present in an amount of about 15 to 20 percent by weight with about 1 to about 5 percent by weight of chocolate liquor. For those compositions in which medium fat cocoa (10–12% cocoa butter) is used, the amount of chocolate liquor will be sufficient to bring the total cocoa butter/fat content to about 2.0 to 5.0%, more preferably about 2.5 to 4.5%.

Each of the cocoas and chocolate liquor used above are available from commercial sources such as Guittard Chocolate Company (Burlingame, Calif., USA), E.D.S. Man Cocoa Products (Glassboro, N.J., USA) and Grace Cocoa (Milwaukee, Wis., USA). A preferred supplier is Guittard Chocolate Company.

The sweetener chosen in this invention may be of any monosaccharide or disaccharide, for example, fructose, sucrose or dextrose. Additionally, combinations of different monosaccharides and disaccharides can be used. The choice can be based on flavor or the effect as a preservative in lowering the water activity. Preferably, the sweetener is fructose or sucrose. The amount and type of sweetener will vary with the quantity of the flavoring used. The usage of between 35–50% is preferred. For those compositions in which dextrose is used, it is preferred that the dextrose be used in combination with a second sweetener and that the amount of dextrose be limited to 50% of the combined sweeteners.

The use of an acidulant is helpful to bring the formulation into a pH range that is favorable for the enzyme activity. This will depend on the type of enzyme. In general, hydrolytic enzymes such as amylases, pentosanases and pectinases favor an acidic environment of pH 4–5.5. The type of acidulant is preferably a weak acid such as acetic acid, citric acid, malic acid, lactic acid, or combinations thereof. The amount will depend upon the type used. Less than 1% of lactic acid is preferred in this invention.

The use of potassium sorbate as a mold inhibitor is part of the commercial advantage to the packaging and processing. The amount is typically 0.2% or less. One of skill in the art will understand that a number of other food grade mold inhibitors can also be used.

The enzyme system is chosen to break down a broad range of carbohydrates, recognizing that cocoa solids naturally contain this broad range as part of their physiology in the living cocoa plant. Accordingly, the present invention provides compositions in which a mixture of an a-amylase, a pentosanase and a pectinase are used in combination. The $\alpha$-amylase will preferably be a combination of a bacterial $\alpha$-amylase and a fungal $\alpha$-amylase. Examples of such a-amylases include CLARASE® and TENASE® (sold by Solvay Enzymes, Elkhart, Ind., USA), as well as CANALPHA® and BIOBAKE® (sold by Quest International, Sarasota, Fla., USA). The use of both a fungal source $\alpha$-amylase and a bacterial source $\alpha$-amylase extends the types of carbohydrate hydrolysis which occur. A second enzyme, or group of enzymes, used in the present compositions are the pentosanases. As used herein, the term "pentosanase" is meant to include single enzymes as well as enzyme complexes which contain xylanase activity, cellulase activity, hemi-cellulase activity, $\beta$-glucanase activity or combinations thereof. One example of a pentosanase complex containing such activity is the enzyme complex from *Trichoderna reesei* (marketed by Quest International under the name BIOPENTOSANASE®). Incorporation of a pentosanase is useful for the hydrolysis of pentosans which account for part of the syrup thickening with time due to the ability of pentosans to preferentially absorb water from other dissolved materials in the syrup. A pectinase is also used in the present compositions to degrade the pectins so that they are not active to absorb water to form a gel type structure. An example of a suitable pectinase is an enzyme system derived from a strain of *Aspergillius niger* (marketed by Quest International under the name BIOPECTINASE OK SYSTEM®). Reducing the pentosan and pectin activity also reduces the tendency of the syrup to either retrograde or thicken after time. In addition to the enzymes and suppliers noted above, similar "food-grade" enzymes are available from commercial sources such as Genencor (Rochester, N.Y., USA) and Novo Nordisk Biochem North America (Danbury, Conn., USA).

The amounts of each of the above enzymes depends upon their activity as provided by the manufacturer. For example, an a-amylase with an activity of 800,000FAAu/g (Fungal Alpha Amylase units/gram) is typically used at about 0.04% by weight. A pectinase having an activity of 30OPGu/mL (Pectinase units/mL) is also preferably used at about 0.04% by weight. A pentosanase having an activity of 14,500 Xylu/g (Xylanase units/gram) can be used at about 0.04% by weight. And, finally, a bacterial $\alpha$-amylase having an activity of 60,000BAAu/g (Bacterial amylase units/gram) can be used at about 0.02 weight percent. Thus, the use of about 0.02–0.04% of each of the enzymes named above is preferred in the present compositions.

The use of spices and extracts to enhance the natural chocolate flavors is accounted for in this invention. Vanilla extract in any of its forms is useful and at any level necessary for flavoring, generally under 2%. Additionally, the pH which is a partial predictor of flavor is not restricted in this formulation and can vary greatly.

Preparation of Cocoa/chocolate liquor compositions

Preparation of the above compositions typically requires proper hydration of the flavoring material, without excessive cooking that can begin to dehydrate the granules and prematurely lead to crystallization of the solids in the system. The thickening of the syrup over time is both a function of crystallization by some components and hydration of other components. Preferably, the cocoa is alternately blended with portions of water with agitation to disperse the powder. The acidulant and mold inhibitor can be added, and heat is applied sufficient to hydrate but low enough to avoid dehydration on the surface and sides of the cooking vessel. Such dehydration would result in the initiation of crystal growth of the solids present. This precrystallization would further enhance undesirable crystal growth of the carbohydrates and proteins in the system, with time. Use of extra water at the rate of 3.5 weight percent of the water content is useful in achieving proper hydration during this stage. Reaching a temperature of 175° F. is sufficient to complete the hydration. Hydration also prepares the carbohydrates to be hydrolyzed by the enzymes. A holding time of 5 minutes is typically adequate once at temperature. When present, the chocolate liquor can be added at its melting range starting at about 80° F.

Cooling and temporarily thinning the mixture can be accomplished by addition of the sweetener. For this formulation a temperature of 135° F. is preferred. At this temperature the enzymes can be introduced. The temperature optimum for three of the enzymes is about 135°–145° F. Accordingly, a hold time of 15–30 minutes at this temperature is desirable. The fourth enzyme has a temperature optimum of 160°–170° F. A second hold time of 15–30 minutes at this more elevated temperature is subsequently used.

Once the enzymes have acted on the appropriate substrates, the enzyme activity should be quenched by heating the mixture to about 185° F. At this temperature, the enzymes are typically denatured and no further uncontrolled activity is found. Preferably the compositions are held at temperatures of from 185° F. to 190° F. for periods of about 5 minutes.

Following enzyme denaturation, the spice ingredients can be added and the resulting compositions can be packaged.

Preferably, the syrup is cooled before packaging to prevent crystal growth. A cooling medium is used to drop the temperature of the syrup within 5 minutes from 185° F. to between about 70°–100° F. A slower cooling rate is undesirable as it leads to slow, large growth of carbohydrate, protein or fat crystals. Commercially sterile packaging can then be filled using the resulting composition at temperatures of about 70–100° F.

In preferred embodiments, the compositions can be prepared by combining the acidulant and mold inhibitor in a minimum amount of water and alternately adding portions of the cocoa and water with agitation until a smooth mixture is obtained. A small additional portion of water (about 2–7% of that which is already present) is added and will be lost during cooking. The resulting mixture is heated to at least about 75° F. and any chocolate liquor is added. The mixture is then heated to 165°–170° F. and held at that temperature for about 5 minutes. After this time, sweetener is added and the temperature is reduced to 135°–140° F. The enzyme mixture is then added and the temperature is held constant for 15 min, elevated to 165°–170° F. and held for five minutes, then raised to 185°–190° F. and held for an additional five minutes. Vanilla extract is added and the resulting composition is mixed for 3 minutes then cooled to 70°–100° F. and packaged in sterile containers. In some embodiments, the product is packaged into polypropylene bottles at room temperature and an induction heat seal cap liner is applied to the mouth of the bottle and the cap tightened.

The following examples are provided by way of illustration and not by way of limitation.

EXAMPLES

Materials used in the present invention can be obtained as follows: Enzymes can be obtained from Genencor (Rochester, N.Y., USA), Novo Nordisk Biochem North America (Danbury, Connecticut, USA) or Quest International Bioproducts (Sarasota, Fla., USA). In particular, Biobake alpha amylase 40,000P with an activity of 800,000 FAAu/g used at 0.04 weight percent for an activity of 320 FAAu/g (Fungal Alpha Amylase Units/gram); Biopectinase 300L pectinase with an activity of 300 PGu/ml used at 0.04 weight percent for an activity of 0.12 PGu/ml (Pectanase units/ml); Biopentosanase 5X pentosanase with an activity of 14,500 XYLu/g used at 0.04 weight percent for an activity of 5.8 XYLu/g (Xylanase units/gram); and Canalpha amylase 1000 P with an activity of 60,000 BAAu/g used at 0.02 weight percent for an activity of 12 BAAu/g (Bacterial Amylase units/gram) were all obtained from Quest International.

General Preparation

Potassium sorbate and Lactic acid are combined with a minimum of water in a suitable kettle. Water (10% of the total amount) and cocoa (10% of the total amount) are alternately added in increments with agitation and no heating until all the cocoa and water are added and the mixture is smooth. An additional weight of water equal to 3.5% of the weight of the total water is added. This portion of the water will be evaporated during the cooking process. The resulting mixture is heated to 80° F. Chocolate liquor is added and the mixture is heated to 165°–170° F. After holding the mixture at this temperature for 5 minutes, the heating is stopped and sweetener is added. A reduced temperature of 135°–140° F. is maintained and the enzymes are added. The temperature is held for 15 minutes, then increased to 165°–170° F. and held for 5 minutes. The temperature is then increased to 185°–190° F. and held for 5 minutes. The vanilla extract is added and the resulting composition is mixed for 3 minutes. The product temperature is reduced to 70°–100° F. with active cooling, and the resulting mixture is packaged in commercially sterile containers.

EXAMPLE 1

This example illustrates six compositions which were prepared according to the general method outlined above.

| Component | Weight Percent |
|---|---|
| Composition I | |
| Fructose, Crystalline | 44.50 |
| Water | 34.50 |
| Dutch Process Cocoa (10–12% fat) | 17.00 |
| Chocolate Liquor | 3.00 |
| Lactic Acid, 88% solution | 0.40 |
| Vanilla Extract | 0.36 |
| Potassium sorbate | 0.10 |
| Biobake 40,000 (Quest International) | 0.04 |
| Biopectinase 300L (Quest International) | 0.04 |
| Biopentosanase 5X (Quest International) | 0.04 |
| Canalpha 1000P (Quest International) | 0.02 |
| | 100.00 |
| Composition II | |
| Fructose, Crystalline | 44.51 |
| Water | 34.50 |
| Dutch Process Cocoa (10–12% fat) | 15.00 |
| Chocolate Liquor | 5.00 |
| Lactic Acid, 88% solution | 0.40 |
| Potassium sorbate | 0.10 |
| Vanilla Extract | 0.35 |
| Biobake 40,000 (Quest International) | 0.04 |

-continued

| Component | Weight Percent |
|---|---|
| Biopectinase 300L (Quest International) | 0.04 |
| Biopentosanase 5X (Quest International) | 0.04 |
| Canalpha 1000P (Quest International) | 0.02 |
| | 100.00 |
| Composition III | |
| Fructose, Crystalline | 44.50 |
| Water | 34.50 |
| Dutch Process Cocoa (10–12% fat) | 20.00 |
| Lactic Acid, 88% solution | 0.40 |
| Vanilla Extract | 0.36 |
| Potassium sorbate | 0.10 |
| Biobake 40,000 (Quest International) | 0.04 |
| Biopectinase 300L (Quest International) | 0.04 |
| Biopentosanase 5X (Quest International) | 0.04 |
| Canalpha 1000P (Quest International) | 0.02 |
| | 100.00 |
| Composition IV | |
| Fructose, Crystalline | 44.86 |
| Water | 34.50 |
| Natural Process Cocoa (10–12% fat) | 20.00 |
| Vanilla Extract | 0.40 |
| Potassium sorbate | 0.10 |
| Biobake 40,000 (Quest International) | 0.04 |
| Biopectinase 300L (Quest International) | 0.04 |
| Biopentosanase 5X (Quest International) | 0.04 |
| Canalpha 1000P (Quest International) | 0.02 |
| | 100.00 |
| Composition V | |
| Fructose, Crystalline | 44.46 |
| Sucrose, Crystalline | 5.00 |
| Water | 34.50 |
| Dutch Process Cocoa (10–12% fat) | 12.00 |
| Chocolate Liquor | 3.00 |
| Lactic Acid, 88% solution | 0.40 |
| Vanilla Extract | 0.40 |
| Potassium sorbate | 0.10 |
| Biobake 40,000 (Quest International) | 0.04 |
| Biopectinase 300L (Quest International) | 0.04 |
| Biopentosanase 5X (Quest International) | 0.04 |
| Canalpha 1000P (Quest International) | 0.02 |
| | 100.00 |
| Composition VI | |
| Sucrose, Crystalline | 49.46 |
| Water | 34.50 |
| Dutch Process Cocoa (10–12% fat) | 12.00 |
| Chocolate Liquor | 3.00 |
| Lactic Acid, 88% solution | 0.40 |
| Vanilla Extract | 0.40 |
| Potassium sorbate | 0.10 |
| Biobake 40,000 (Quest International) | 0.04 |
| Biopectinase 300L (Quest International) | 0.04 |
| Biopentosanase 5X (Quest International) | 0.04 |
| Canalpha 1000P (Quest International) | 0.02 |
| | 100.00 |

The foregoing is offered primarily for purposes of illustration. It will be readily apparent to those skilled in the art that modifications and variations may be made in the materials, proportions, conditions and procedures used without departing from the spirit and scope of the invention.

What is claimed is:

1. A composition comprising an admixture of:
   (a) from about 15 to about 20 weight percent chocolate flavoring;
   (b) from about 35 to about 50 weight percent sweetener;
   (c) an enzyme mixture comprising an α-amylase, a pentosanase, and a pectinase; and
   (d) water; said composition having a cocoa butterfat content of from about 2 to about 5% by weight.

2. A composition in accordance with claim 1, further comprising an acidulant, a mold inhibitor, vanilla flavor, or combinations thereof.

3. A composition in accordance with claim 1, wherein said chocolate flavoring is medium fat cocoa.

4. A composition in accordance with claim 1, wherein said chocolate flavoring is a combination of cocoa and chocolate liquor, said cocoa being present in an amount of from 12 to about 19 weight percent and said chocolate liquor being present in an amount of from about 1 to about 5 weight percent.

5. A composition in accordance with claim 2, wherein said acidulant is a member selected from the group consisting of acetic acid, malic acid, citric acid, lactic acid and combinations thereof.

6. A composition in accordance with claim 2, wherein said mold inhibitor is potassium sorbate.

7. A composition in accordance with claim 1, wherein said flavoring is a medium fat cocoa and is present in an amount of from about 17 to about 20 weight percent.

8. A composition in accordance with claim 1, wherein said flavoring is a medium fat cocoa/chocolate liquor combination, said cocoa being present in an amount of from about 12 to about 17 weight percent and said chocolate liquor being present in an amount of from about 3 to about 5 weight percent.

9. A composition in accordance with claim 1, wherein said sweetener is a member selected from the group consisting of sucrose, dextrose and fructose.

10. A composition in accordance with claim 1, wherein said sweetener is fructose and is present in an amount of about 42 to about 47 weight percent.

11. A composition in accordance with claim 1, wherein said flavoring is a cocoa/chocolate liquor combination and said cocoa is present in an amount of about 17 weight percent and said chocolate liquor is present in an amount of about 3 weight percent.

12. A composition in accordance with claim 2, comprising about 44.5 weight percent fructose, about 17 weight percent medium fat cocoa, about 3 weight percent chocolate liquor, about 0.4 weight percent of a 88% aqueous solution of lactic acid, about 0.1 weight percent potassium sorbate, about 0.3 to 0.4 weight percent vanilla and from 0.02 to about 0.04 weight percent of each of said enzymes.

13. A composition in accordance with claim 2, comprising about 44.6 weight percent fructose, about 15 weight percent medium fat cocoa, about 5 weight percent chocolate liquor, about 0.4 weight percent of a 88% aqueous solution of lactic acid, about 0.1 weight percent potassium sorbate, about 0.3 to 0.4 weight percent vanilla and from 0.02 to about 0.04 weight percent of each of said enzymes.

14. A composition in accordance with claim 2, comprising about 44.9 weight percent fructose, about 5 weight percent sucrose, about 12 weight percent medium fat cocoa, about 3 weight percent chocolate liquor, about 0.4 weight percent of a 88% aqueous solution of lactic acid, about 0.1 weight percent potassium sorbate, about 0.3 to 0.4 weight percent vanilla and from 0.02 to about 0.04 weight percent of each of said enzymes.

* * * * *

UNITED STATES PATENT AND TRADEMARK OFFICE
CERTIFICATE OF CORRECTION

PATENT NO. : 5,773,056
DATED : June 30, 1998
INVENTOR(S) : Thalia A. Hohenthal

It is certified that error appears in the above-identified patent and that said Letters Patent is hereby corrected to read as shown below:

Column 3, line 35, replace "E.D.S. Man" with --ED&F Man--

Column 4, line 42, replace "30OPGu/mL" with --300PGu/mL--

Signed and Sealed this

First Day of December, 1998

Attest:

Attesting Officer

BRUCE LEHMAN

Commissioner of Patents and Trademarks